(12) United States Patent
Malach et al.

(10) Patent No.: US 8,429,937 B2
(45) Date of Patent: Apr. 30, 2013

(54) METHOD AND APPARATUS FOR MAKING A SHAPED GLASS ARTICLE

(75) Inventors: Joseph D Malach, Newark, NY (US); Alexander Lamar Robinson, Elmira, NY (US); John Robert Saltzer, Jr., Beaver Dams, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 134 days.

(21) Appl. No.: 12/951,286

(22) Filed: Nov. 22, 2010

(65) Prior Publication Data

US 2011/0126588 A1  Jun. 2, 2011

Related U.S. Application Data

(60) Provisional application No. 61/264,915, filed on Nov. 30, 2009.

(51) Int. Cl.
   *C03B 23/025* (2006.01)

(52) U.S. Cl.
   USPC .................................. 65/107; 65/104; 65/106

(58) Field of Classification Search .................. None
   See application file for complete search history.

(56) References Cited

U.S. PATENT DOCUMENTS

| | | | |
|---|---|---|---|
| 2,840,953 A | 7/1958 | Black | |
| 3,060,708 A | 10/1962 | Stickel | |
| 3,607,186 A * | 9/1971 | Bognar | 65/104 |
| 4,052,184 A * | 10/1977 | Anderson | 65/102 |
| 4,105,429 A * | 8/1978 | Delgado | 65/107 |
| 4,290,796 A * | 9/1981 | Reese et al. | 65/287 |
| 4,404,871 A * | 9/1983 | Fritz et al. | 76/80.5 |
| 4,488,893 A | 12/1984 | Claassen et al. | |
| 5,340,375 A | 8/1994 | Anttonen | |
| 5,674,790 A | 10/1997 | Araujo | |
| 7,666,511 B2 | 2/2010 | Ellison et al. | |
| 2004/0107729 A1* | 6/2004 | Fukami et al. | 65/25.4 |

(Continued)

FOREIGN PATENT DOCUMENTS

WO  2010104698 A1  9/2010

OTHER PUBLICATIONS

Buchel et al. ,"Industrial Inorganic Chemistry", copyright 2000, p. 336.*
Barefoot et al.; U.S. Appl. No. 12/858,490, filed August 18, 2010; Titled: Crack and Scratch Resistant Glass and Enclosures Made Therefrom.

(Continued)

*Primary Examiner* — Christina Johnson
*Assistant Examiner* — Lisa Herring
(74) *Attorney, Agent, or Firm* — Walter M. Douglas

(57) ABSTRACT

A flat glass sheet and a mold having a mold cavity defined by a shaping surface are provided. The shaping surface has a surface profile of a shaped glass article. At least one edge alignment pin is provided on the mold at an edge of the shaping surface. The glass sheet is leaned against the edge of the shaping surface such that an edge of the glass sheet abuts the edge alignment pin. The glass sheet is then heated. The glass sheet is sagged onto the shaping surface of the mold so that the glass assumes the surface profile of the shaped glass article and thereby form the shaped glass article. The edge alignment pin aligns the edge of the glass sheet with the mold cavity as the glass sheet sags onto the shaping of the mold. The shaped glass article is removed from the mold.

15 Claims, 6 Drawing Sheets

U.S. PATENT DOCUMENTS

| | | | |
|---|---|---|---|
| 2008/0286548 A1* | 11/2008 | Ellison et al. | 428/220 |
| 2009/0059383 A1* | 3/2009 | Fournand et al. | 359/642 |
| 2009/0142568 A1 | 6/2009 | Dejneka et al. | |
| 2009/0215607 A1 | 8/2009 | Dejneka et al. | |
| 2009/0220761 A1 | 9/2009 | Dejneka et al. | |
| 2010/0000259 A1 | 1/2010 | Ukrainczyk et al. | |
| 2010/0035038 A1 | 2/2010 | Barefoot et al. | |
| 2010/0229602 A1* | 9/2010 | Ross et al. | 65/107 |

OTHER PUBLICATIONS

Dejneka et al.; U.S. Appl. No. 12/856,840, filed August 16, 2010; Titled: Zircon Compatible Glasses for Down Draw.

Vogel, Werner. Chemistry of Glass. Wiley, 1985, pp. 22-24.

Pfaender, Heinz G. Schott Guide to Glass. Van Nostrand Reinhold Company, 1983, pp. 18-21.

* cited by examiner

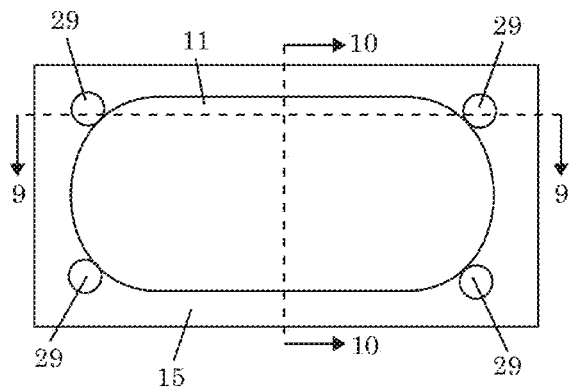
FIG. 8
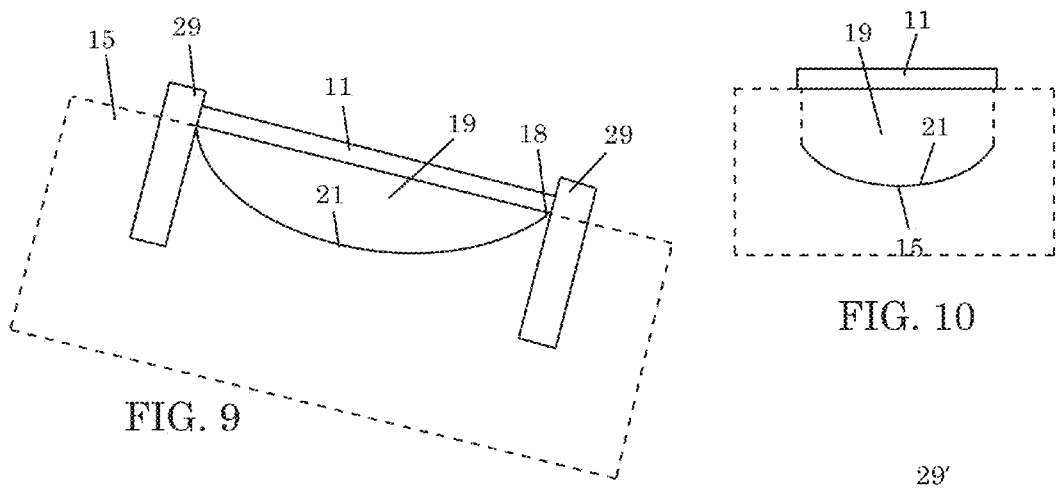
FIG. 9
FIG. 10
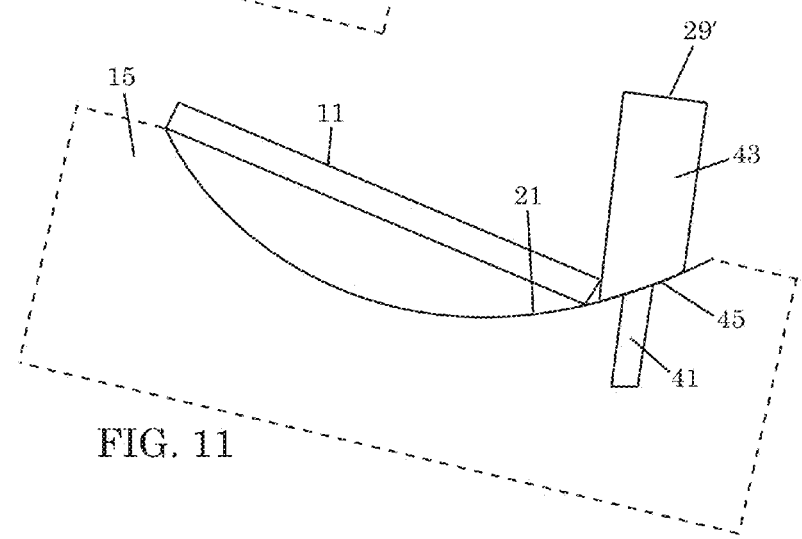
FIG. 11

METHOD AND APPARATUS FOR MAKING A SHAPED GLASS ARTICLE

CROSS-REFERENCE TO RELATED APPLICATIONS

This application claims benefit of U.S. Provisional Application No. 61/264,915, filed 30 Nov. 2009.

TECHNICAL FIELD

The invention relates generally to methods and apparatus for making a shaped glass article. More specifically, the invention relates to alignment of a flat glass sheet on a mold.

BACKGROUND

Glass reforming processes require a cold glass preform to be heated to a sufficiently low viscosity at which the glass can be reformed. As described in U.S. Publication No. 2010/0000259, published Jan. 7, 2010, a method for making a shaped glass article involves placing a flat glass sheet on a mold, heating the flat glass sheet (typically to a temperature at or near its glass transition temperature), and molding the flat glass sheet into a three-dimensional shape. The shaped glass sheet is removed from the mold and annealed. After annealing, the edge of the shaped glass sheet is contoured to a final precise dimension and finished. For a flat glass sheet, contouring of the edge of the glass sheet can be done at a low cost on a 3-axis machine. However, for a shaped glass sheet, if the edge contour is a complex curve, contouring the edge of the glass sheet to the final precise dimension may require a 4- or 5-axis machine, which is typically cost prohibitive. The previously mentioned U.S. Publication No. 2010/0000259 describes a second approach to reforming where the edge of a flat glass sheet is contoured and finished prior to the flat glass sheet being reformed into a shaped glass sheet. With this second approach, additional contouring and finishing of the edge of the shaped glass sheet is not needed.

In the second approach, the contoured flat glass sheet, which can have a complex shape, would have to be placed on the mold at a very precise position to form the shaped glass sheet with the final precise dimension. This precise positioning can be challenging because of thermal expansions and movement that occur during heating of the glass sheet and mold. Glass often has a very high thermal expansion when it is brought above glass transition temperature. For example, its expansion can easily exceed that of the mold material (where the mold material may be metal or ceramic). FIG. 1A shows a typical behavior for glass 100, made of Gorilla™ glass (available from Corning Incorporated, Corning, N.Y., under code 2317), and mold 102, made from Inconel 718. In FIG. 1A, the glass expansion exceeds that of the mold expansion above 600° C.

FIG. 1B shows placement of a flat glass sheet 1 on a horizontal mold 3 in a constrained condition. The flat glass sheet 1 is positioned on the top surface 2 of the mold 3 so that it covers the mold cavity 4. Alignment pins 5 are used to center the flat glass sheet 1 above the mold cavity 4 before the glass sheet 1 is heated and formed into the shaped glass article 6. If the flat glass sheet 1 is placed in the constrained condition shown in FIG. 1B before it is heated, the flat glass sheet 1 would simply break once it is near its glass transition temperature because it won't be able to expand. FIGS. 1C, 1D, and 1E show additional examples of constrained placement of the flat glass sheet 1. In FIGS. 1C and 1D, alignment pins 7 are used to locate the cold flat glass sheet 1 precisely on the mold 3 prior to heating and forming the glass sheet. In FIG. 1E, alignment blocks 8 are used for the same purpose as the alignment pins 7. The placements in FIGS. 1C-1E are over-constrained. To avoid breaking of the glass, one might consider heating the glass to a temperature at or near the glass transition temperature and then placing the heated glass on the mold in a constrained condition. However, this approach is not suitable for a thin glass (<2.5 mm) because the glass will warp and distort when heated and will no longer have the flat surface required for precise alignment on the mold.

SUMMARY

In a first aspect of the present invention, a method of making a shaped glass article comprises (a) providing a flat glass sheet, (b) providing a mold having a mold cavity defined by a shaping surface, the shaping surface having a surface profile of the shaped glass article, (c) providing at least one edge alignment pin on the mold at an edge of the shaping surface, (d) leaning the glass sheet against the edge of the shaping surface such that one end of the glass sheet abuts the edge alignment pin, (e) heating the glass sheet, (f) sagging the glass sheet onto the shaping surface of the mold so that the glass sheet assumes the surface profile of the shaped glass article and thereby form the shaped glass article, wherein the edge alignment pin aligns the edge of the glass sheet with the mold cavity as the glass sheet sags onto the shaping surface of the mold, and (g) removing the shaped glass article from the mold.

In one embodiment of the present invention, step (a) comprises (a1) contouring the edge of the flat glass sheet to a final net shape.

In one embodiment of the present invention, step (1) comprises finishing the edge of the glass sheet.

In one embodiment of the present invention, step (e) comprises preferentially heating the glass sheet so that the mold remains substantially cooler than the glass sheet during the heating.

In one embodiment of the present invention, the method further comprises (h) tilting the mold so that the end of the glass sheet abutting the edge alignment pin latches onto the edge alignment pin by gravity.

In one embodiment of the present invention, step (e) comprises (e1) heating the glass sheet to a temperature below a softening point of the glass sheet.

In one embodiment of the present invention, step (e) comprises (e2) heating the glass sheet to a temperature between a softening point and an annealing point of the glass sheet.

In one embodiment of the present invention, the method further comprises (i) applying vacuum in between the glass sheet and the shaping surface before step (f).

In one embodiment of the present invention, the method further comprises (j) applying a vacuum in between the glass sheet and the shaping surface through at least a portion of step (f).

In one embodiment of the invention, the method further comprises (k) cooling down the glass sheet in the mold prior to step (g).

In one embodiment of the present invention, the method further comprises (l) annealing the shaped glass article.

In one embodiment of the present invention, the method further comprises (m) chemically-strengthening the shaped glass article.

In one embodiment of the present invention, the method further comprises (n) applying an anti-smudge coating on the shaped glass article.

It is to be understood that both the foregoing general description and the following detailed description are exemplary of the present invention and are intended to provide an overview or framework for understanding the nature and character of the present invention as it is claimed. The accompanying drawings are included to provide a further understanding of the present invention and are incorporated in and constitute a part of this specification. The drawings illustrate various embodiments of the present invention and together with the description serve to explain the principles and operation of the present invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 8 shows a glass sheet alignment arrangement when the mold cavity has a deep contour.

FIG. 9 is a cross-section of FIG. 8 along line 9-9.

FIG. 10 is a cross-section of FIG. 8 along line 10-10.

FIG. 11 shows an edge alignment pin following a contoured surface of a mold.

DETAILED DESCRIPTION

Figure 1A:
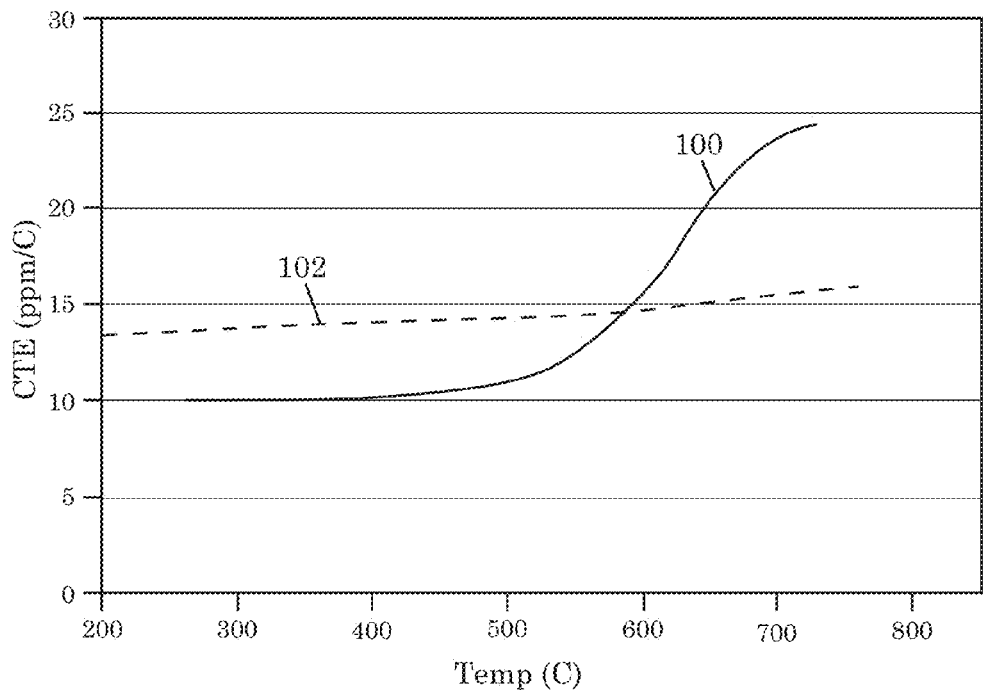
FIG. 1A is a plot showing thermal expansion behavior of a glass material and mold material.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

Figure 2:
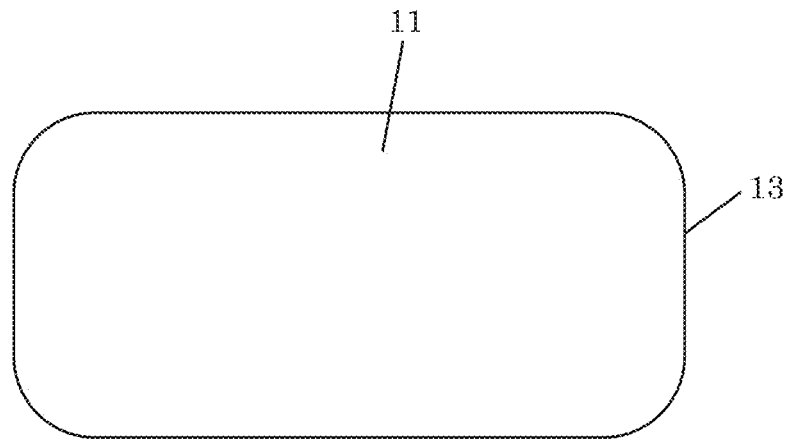
FIG. 2 is a top view of a flat glass sheet having a contoured edge.

A method of making a shaped glass article includes providing a flat glass sheet. The term "shaped glass article" as used herein means that the glass article has a three-dimensional shape. The flat glass sheet may be made from any glass composition suitable for the intended application of the shaped glass article. As will be further described below, the flat glass sheet may in certain aspects be made of an ion-exchangeable glass. The method further includes contouring the edge of the flat glass sheet to a final net shape. Techniques such as machining may be used to contour the edge of the flat glass sheet. A suitable multi-axis CNC (computer numeric control) machine may be used to contour the edge of the flat glass sheet. Typically, a 3-axis CNC machine would be sufficient. FIG. 2 shows an example of a flat glass sheet 11 having a contoured edge 13 in a final net shape. The method includes finishing the contoured edge 13. Techniques such as grinding and fire-polishing may be used to finish the contoured edge 13.

Figure 3:
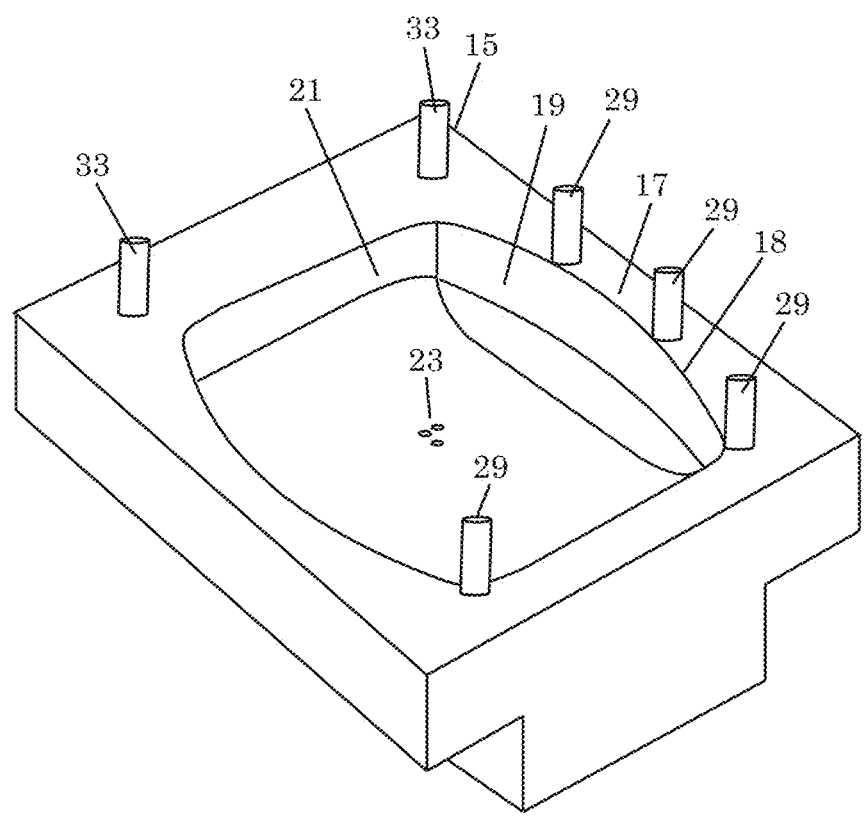
FIG. 3 is a perspective view of a mold.

The method further includes providing a mold. FIG. 3 shows an example of a mold 15 having a mold body 17 with a cavity 19 defined by a shaping surface 21. The shaping surface 21 has a surface profile corresponding to the shape of the shaped glass article. In general, the surface profile of the shaping surface 21 will vary depending on the shape of the shaped glass article to be formed. The mold body 17 may include one or more slots 23 for providing vacuum to the cavity 19. A set of alignment pins 29 is positioned at the edge 18 of the shaping surface 21. The alignment pins 29 will be referred to as "edge alignment pins" because they will contact and align the edge of the flat glass sheet as the flat glass sheet sags into the mold cavity 19. The edge alignment pins 29 may be positioned inside or outside of the mold cavity 19. In FIG. 3, the edge alignment pins 29 are positioned outside of the mold cavity 19. The positions of the edge alignment pins 29 on the mold correspond to points on the flat glass sheet when the flat glass sheet is properly aligned on the mold. Placement of the flat glass sheet on the mold involves matching the points on the flat glass sheet with the positions of the edge alignment pins 29. A set of alignment pins 33 is offset from the edge of the shaping surface 21. The alignment pins 33 will be referred to as offset alignment pins. The offset alignment pins 33 assist in positioning a flat glass sheet on the mold 15 and controlling lateral movement of the flat glass sheet. The mold 15 is made of a heat-resistant material, preferably one that is inert under the conditions in which the shaped glass article will be formed. Suitable examples of mold material include high-temperature steel and cast iron. The shaping surface 21 may be coated with a high-temperature material to extend the life of the mold 15. Preferably, the coating material is also inert under the conditions in which the shaped glass article will be formed. An example of a suitable coating material is Diamond Chromium coating from Armoloy.

Figure 4:
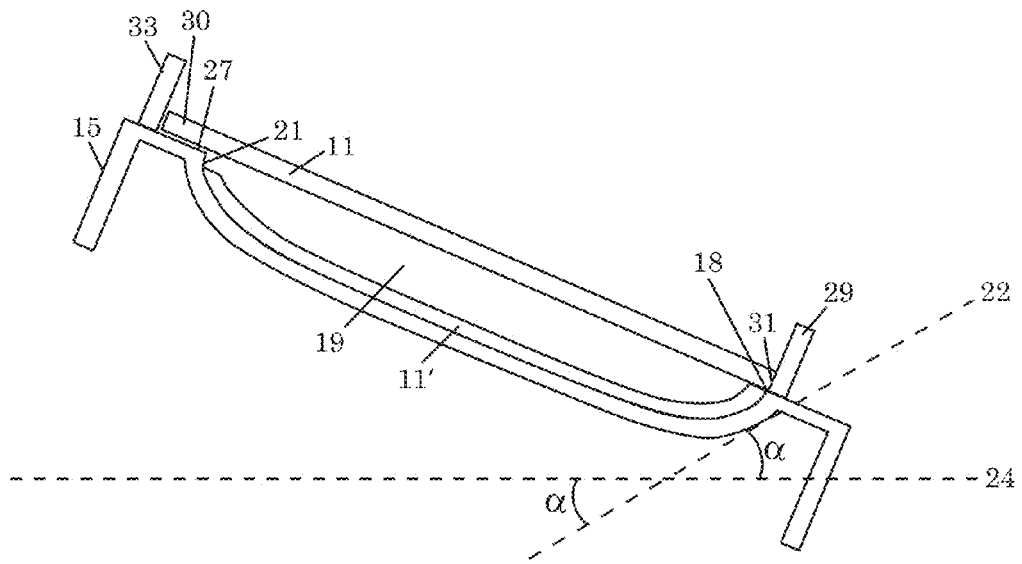
FIG. 4 illustrates aligning of a flat glass sheet on a mold.

The method further includes aligning the flat glass sheet 11 on the mold 15, as illustrated in FIG. 4. In FIG. 4, the flat glass sheet 11 leans against the edge 18 of the shaping surface 21. One side of the flat glass sheet 11 extends out of the mold cavity 19, as shown at 30. Another side of the flat glass sheet 11 abuts the edge alignment pins 29 (only one edge alignment pin 29 is visible in FIG. 4), as shown at 31. To prevent the flat glass sheet 11 from sliding into the mold cavity 19 at the side that abuts the edge alignment pins 29, the mold 15 is tilted at an angle so that the flat glass sheet 11 latches onto the edge alignment pins 29 by gravity. The tilt angle α of the mold 15 is typically between 0° and 20°. The tilt angle is measured from a tangent 22 to the shaping surface 21 to the horizontal 24. The offset alignment pins 33 (only one is visible in FIG. 4) help to locate the flat glass sheet 11 on the mold 15 and to control lateral movement of the flat glass sheet 11. When the flat glass sheet 11 is sagged into the mold cavity 19, as will be further explained below, the edge alignment pins 29 (being in contact with the edge of the flat glass sheet 11) keep the flat glass sheet 11 aligned (at the edge) with the mold cavity 19.

Figure 1B:
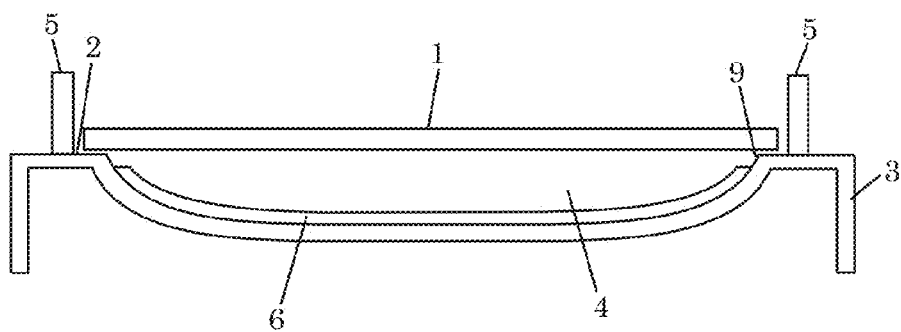
FIG. 1B is a cross-sectional view of a constrained placement of a flat glass sheet on a horizontal mold.
Figure 1C:
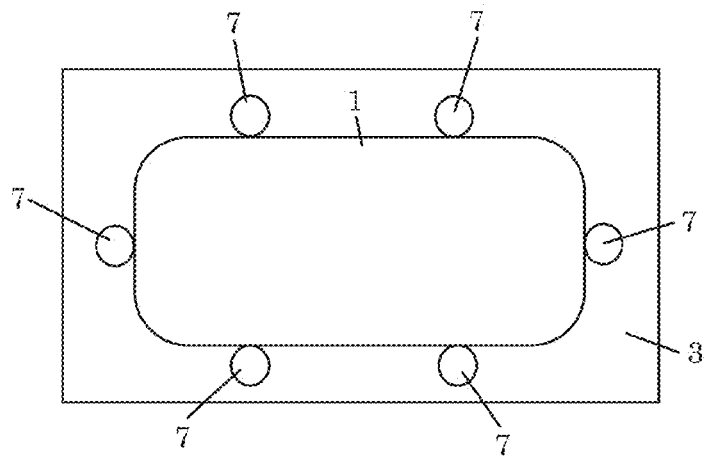
FIG. 1C is a top view of an over-constrained placement of a flat glass sheet on a mold.
Figure 1D:
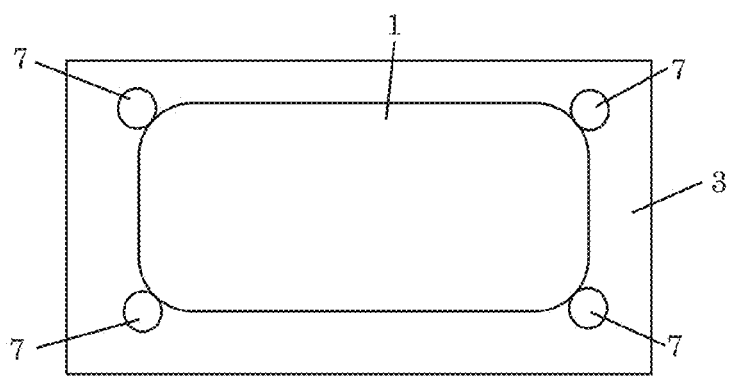
FIG. 1D is a top view of another over-constrained placement of a flat glass sheet on a mold.
Figure 1E:
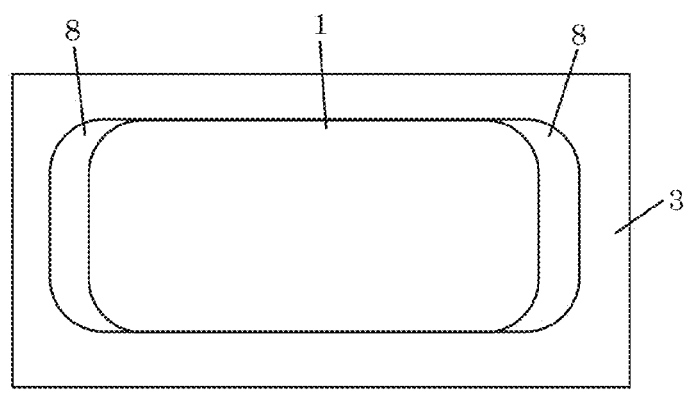
FIG. 1E is a top view of yet another over-constrained placement of a flat glass sheet on a mold.
Figure 5:
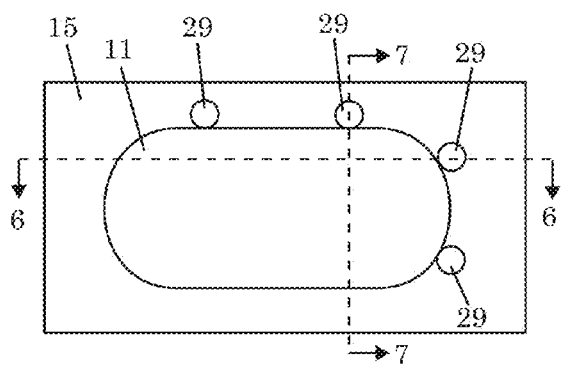
FIG. 5 shows a glass sheet alignment arrangement when the mold cavity does not have a deep contour.
Figure 6:
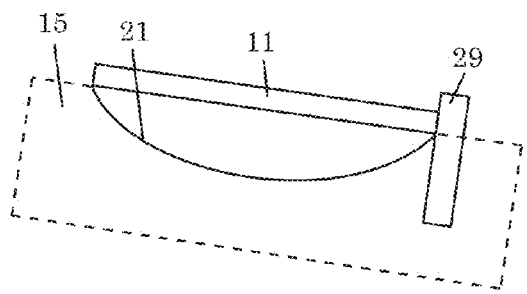
FIG. 6 is a cross-section of FIG. 5 along line 6-6.
Figure 7:
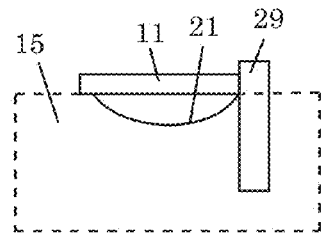
FIG. 7 is a cross-section of FIG. 5 along line 7-7.

FIG. 5 shows a glass sheet alignment arrangement when the contour along the periphery of the mold cavity is shallow. In FIG. 5, four edge alignment pins 29 are positioned at a corner of the flat glass sheet 11. FIG. 6 shows a cross-section of the arrangement of FIG. 5 along line 6-6, and FIG. 7 shows a cross-section of the arrangement of FIG. 5 along line 7-7. In FIG. 6, one end of the flat glass sheet 11 abuts the edge alignment pins 29, as explained above, and the mold 15 is tilted so that the side of the flat glass sheet 11 latches onto the edge alignment pins 29 by gravity. FIG. 8 shows a glass sheet alignment when the contour along the periphery of the mold cavity is deep. In FIG. 8, four edge alignment pins 29 are positioned at opposite ends of the flat glass sheet 11. The placement of FIG. 8 appears on the surface to resemble that of FIG. 1D. However, note that in FIG. 8 the edge alignment pins 29 perform the function of edge-aligning as opposed to the function of laterally-constraining shown in FIG. 1D. This is clearer in FIG. 9, which is a cross-section of FIG. 8 along line 9-9. In FIG. 9, the edge alignment pins 29 are at the edge 18 of the shaping surface 21 in a position to abut the edge of the glass sheet 11 and guide the edge of the glass sheet as the glass sheet sags into the mold cavity. The alignment pins 7 of FIG. 1D are offset from the edge of the shaping surface in a manner similar to that shown for alignment pins 5 in FIG. 1B and do not provide edge-aligning. FIG. 10 shows a cross-section of the arrangement of FIG. 8 along line 10-10. In FIG. 9, the flat glass sheet 11 abuts the edge alignment pins 29, and the mold 15 is tilted so that the flat glass sheet 11 latches onto the edge alignment pins 29 by gravity.

Figure 12:
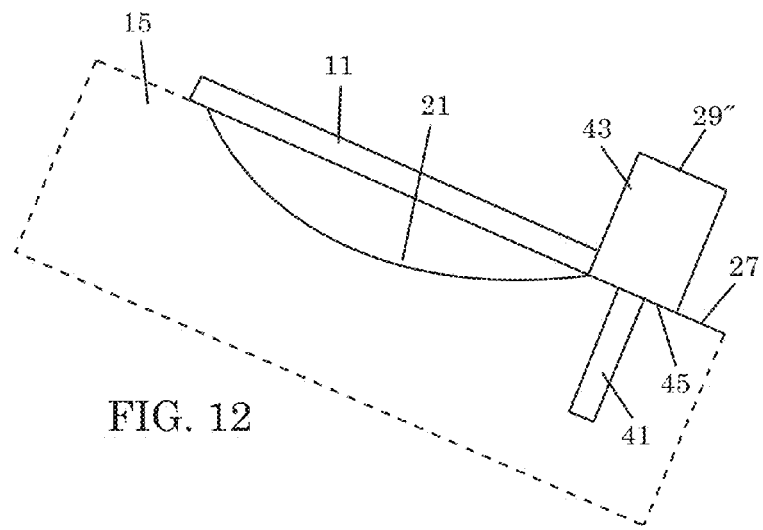
FIG. 12 shows an edge alignment pin positioned on a flat surface of a mold.
Figure 13:
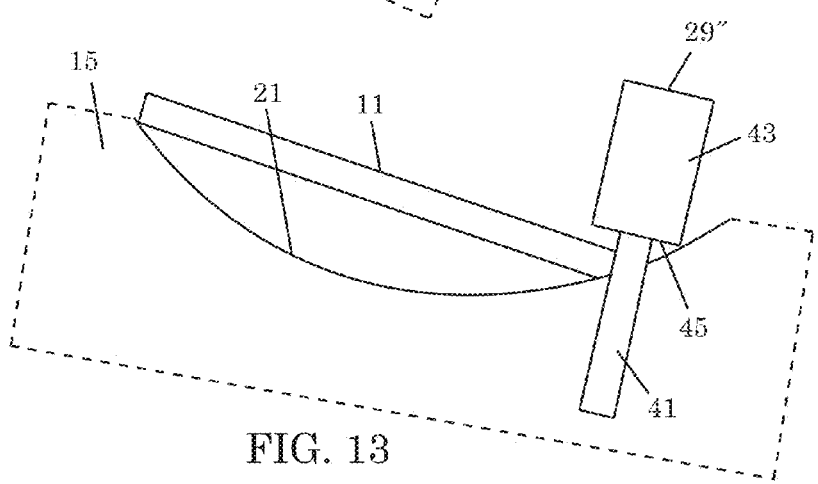
FIG. 13 shows an edge alignment pin positioned on a contoured surface of a mold in an elevated position.

FIGS. 11-13 show glass sheet alignment with stepped edge alignment pins 29', 29". In FIGS. 11 and 12, the stepped alignment pin 29' has an enlarged part 43 and a slender part 41. In FIG. 11, the alignment pin 29' is positioned at the edge of the mold shaping surface 21, with the slender part 41 extending into the body of the mold 15 and the enlarged part 43 protruding from the mold shaping surface 21. The bottom surface 45 of the enlarged part 43, which rests on the mold surface 21, is shaped to follow the profile of the mold surface 21. In this arrangement, the flat glass sheet 11 abuts the enlarged part 43. In FIG. 12, the edge alignment pin 29" is positioned on the top (flat) surface 27 of the mold 15 at the edge of the shaping surface 21, with the slender part 41 extending into the mold body 17 and the enlarged part protruding 43 from the top surface 27. The bottom surface 45 of the enlarged part 43, which rests on the top surface 27, is flat. In this arrangement, the flat glass sheet 11 also abuts the enlarged part 43. In FIG. 13, the alignment pin 29" is positioned at the edge of the shaping surface 21 as in the case of FIG. 11. However, in FIG. 13, the bottom surface 45 of the enlarged part 43 is flat and the bottom surface 45 is elevated relative to the shaping surface 21 so that there is a gap between the bottom surface 45 of the enlarged part 43 and the shaping surface 21. The flat glass sheet 11 fits into this gap and abuts the slender part 41 of the alignment pin 29". The enlarged part 43 keeps the flat glass sheet 11 from sliding up the alignment pin 29".

Figure 14:
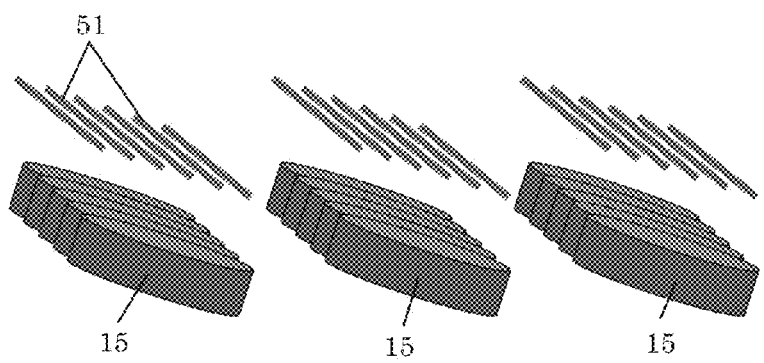
FIG. 14 shows a heating arrangement for multiple titled molds.

After aligning the flat glass sheet on the mold as described above, the method further includes heating the flat glass sheet and the mold. Heating is preferably done preferentially and rapidly by radiation as described in U.S. patent application Ser. No. 12/493,674, filed Jun. 29, 2009. Mid-infrared heaters may be used for the heating. The preferential heating is such that the mold remains substantially colder than the glass sheet during the heating. For the tilted mold, the heater is preferably arranged so that it directs heat to the glass sheet along a substantially normal direction to the glass sheet. FIG. 14 shows a heating arrangement for multiple tilted molds—the same arrangement is suitable for a single tilted mold. In general, the heaters 51 are tilted by roughly the same tilt angle as the molds 15 to ensure uniformity in heating of the glass sheet. The heaters may, for example, be mounted on a frame that can be tilted relative to the horizontal by a tilt angle between 0° and 20°. (It should be noted that only representations of the molds 15 and heaters 51 are shown in FIG. 14.)

Referring to FIG. 4, the method further includes sagging the flat glass sheet 11 onto the shaping surface 21 of the mold 15 so that the glass sheet 11 assumes the shaping surface profile of the shaping surface 21. The shaped glass article formed as a result of the sagging is shown at 11'. During heating and sagging of the glass sheet 11, the edge alignment pins 29 maintain edge alignment of the glass sheet 11 to the mold cavity 19. Sagging the glass sheet 11 onto the shaping surface 21 may include connecting the slots (23 in FIG. 3) of the mold 15 to a vacuum pump or other device that can apply vacuum to the mold cavity 19. The vacuum is applied to the mold cavity 19 when the glass sheet 11 has been heated to a temperature such that the viscosity of the glass sheet 11 is at approximately $10^9$ Poise. At the time the vacuum is applied to the mold cavity 19, the temperature of the glass sheet is at the forming temperature, typically below the softening point of the glass, and preferably between the softening point and the annealing point of the glass. The device applies vacuum to the glass sheet 11 through the cavity 19, pulling the glass sheet 11 into the mold cavity 19 and against the shaping surface 21 so that the glass sheet 11 assumes the shape of the shaping surface 21, as shown at 11'. This process of pulling the glass sheet 11 against the shaping surface 21 is referred to as vacuum-sagging. Vacuum may be applied to the mold cavity 19 before the glass sheet 11 starts sagging into the mold cavity 19 by gravity. Alternatively, vacuum may be applied to the mold cavity 19 after the glass sheet 11 has started sagging into the mold cavity 19 by gravity.

The shaped glass article 11' is cooled, typically while sitting in the mold 15. Cooling may be by exposing the mold 15 to ambient air or by circulating cooling air or gas around the mold 15 and the shaped glass article 11'. Typically, the shaped glass article 11' is cooled down to a temperature below its annealing point, preferably to a temperature below its strain point. After cooling, the shaped glass article 11' is removed from the mold 15. At this point, the shaped glass article 11' may be subject to strengthening processes. The method may include annealing the shaped glass article 11'. After annealing, the shaped glass article 11' may be chemically-strengthened by ion-exchange. The method may further include applying an anti-smudge coating on the shaped glass article 11', typically as the final step in the making of the shaped glass article. The method described above may be used to make a single shaped glass article or multiple shaped glass article in one process. To make multiple shaped glass article, multiple molds can be used as illustrated in FIG. 14.

The flat glass sheet may be made from any glass composition suitable for the intended application of the shaped glass article. In certain aspects, the glass sheet is made of an ion-exchangeable glass, e.g., an alkali-containing glass capable of being strengthened by ion-exchange. The ion-exchangeable glass has a structure that initially contains small alkali ions, such as $Li^+$, $Na^+$, or both, that can be exchanged for larger alkali ions, such as $K^+$, during an ion-exchange process. Examples of suitable ion-exchangeable glasses are alkali-aluminosilicate glasses such as described in U.S. Pat. No. 7,666,511 and US Publication Nos. 2009/0142568, 2009/0215607, 2009/0220761, and 2010/0035038; U.S. patent application Ser. Nos. 12/858,490 and 12/856,840 (all assigned to Corning Incorporated), the contents of which are incorporated herein by reference in their entirety. These glasses can be ion-exchanged at relatively low temperatures and to a depth of at least 30 µm.

A process for strengthening glass by ion-exchange is described in, for example, U.S. Pat. No. 5,674,790 (Araujo, Roger J.). The ion-exchange process typically occurs at an elevated temperature range that does not exceed the transition temperature of the glass. The process is carried out by immersing the glass in a molten bath containing an alkali salt (typically a nitrate) with ions that are larger than that of the host alkali ions in the glass. The host alkali ions are exchanged for the larger alkali ions. For example, a glass containing $Na^+$ may be immersed in a bath of molten potassium nitrate ($KNO_3$). The larger $K^+$ present in the molten bath will replace the smaller $Na^+$ in the glass. The presence of the larger alkali ions at sites formerly occupied by small alkali ions creates a compressive stress at or near the surface of the glass and tension in the interior of the glass. The glass is removed from the molten bath and cooled down after the ion-exchange process. The ion-exchange depth, i.e., the penetration depth of the invading larger alkali ions into the glass, is typically on the order of 40 µm to 300 µm and is controlled by the glass composition and immersion time. When the ion-exchange process is properly executed, a scratch-resistant glass surface can be formed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making a shaped glass article, comprising:
   (a) providing a flat glass sheet;
   (b) providing a mold having a mold cavity defined by a shaping surface, the shaping surface having a surface profile of the shaped glass article;
   (c) providing at least one edge alignment pin on the mold at an edge of the shaping surface or on the shaping surface;
   (d) aligning the glass sheet on the mold by placing the glass sheet on the mold such that an edge of the glass sheet abuts the at least one edge alignment pin and tilting the mold such that the edge of the glass sheet abutting the at least one edge alignment pin latches onto the at least one edge alignment pin by gravity;
   (e) heating the glass sheet;
   (f) sagging the glass sheet onto the shaping surface of the mold so that the glass sheet assumes the surface profile of the shaped glass article and thereby form the shaped glass article, wherein the at least one edge alignment pin aligns the edge of the glass sheet with the mold cavity as the glass sheet sags onto the shaping surface of the mold; and
   (g) removing the shaped glass article from the mold;
   wherein the at least one edge alignment pin provided in step (c) is a stepped pin having an enlarged part and a slender part, and wherein the aligning of step (d) the end of the glass sheet abuts the slender part.

2. The method of claim 1, wherein step (a) comprises:
   (a1) contouring the edge of the flat glass sheet to a final net shape.

3. The method of claim 2, wherein step (a1) comprises:
   (a2) finishing the edge of the glass sheet.

4. The method of claim 1, wherein step (e) comprises preferentially heating the glass sheet so that the mold remains substantially cooler than the glass sheet during the heating.

5. The method of claim 1, wherein in step (d), a tilt angle of the mold relative to the horizontal is between 0° and 20°.

6. A method according to claim 1, wherein step (e) comprises:
   (e1) heating the glass sheet to a temperature below a softening point of the glass sheet.

7. A method according to claim 1, wherein step (e) comprises:
   (e2) heating the glass sheet to a temperature between an annealing point and a softening point of the glass sheet.

8. A method according to claim 1, further comprising:
   (i) applying vacuum in between the glass sheet and the shaping surface before step (f).

9. A method according to claim 1, further comprising:
   (j) applying vacuum in between the glass sheet and the shaping surface through at least a portion of step (f).

10. A method according to claim 1, further comprising:
    (k) cooling down the glass sheet in the mold prior to step (g).

11. A method according to claim 1, further comprising:
    (l) annealing the shaped glass article.

12. A method according to claim 1, further comprising:
    (m) chemically-strengthening the shaped glass article.

13. A method according to claim 1, further comprising:
    (n) applying an anti-smudge coating on the shaped glass article.

14. The method of claim 1, wherein at least one heater is used in the heating of step (e), and wherein the at least one heater is arranged to direct heat to the glass sheet along a substantially normal direction to the glass sheet.

15. The method of claim 14, wherein the mold and the at least one heater are each tilted relative to the horizontal at an angle between 0° and 20° during the heating of step (e).

* * * * *